(12) United States Patent
Seguine

(10) Patent No.: US 7,253,643 B1
(45) Date of Patent: Aug. 7, 2007

(54) UNINTERRUPTED RADIAL CAPACITIVE SENSE INTERFACE

(75) Inventor: Ryan D. Seguine, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 11/489,944

(22) Filed: Jul. 19, 2006

(51) Int. Cl.
*G01R 27/26* (2006.01)
*G09G 5/00* (2006.01)

(52) U.S. Cl. .................. 324/686; 345/173; 345/174
(58) Field of Classification Search ................ 324/686; 345/173, 174, 184
See application file for complete search history.

(56) References Cited

U.S. PATENT DOCUMENTS

| | | | |
|---|---|---|---|
| 4,264,903 A * | 4/1981 | Bigelow | 341/1 |
| 4,283,713 A | 8/1981 | Philipp | |
| 4,438,404 A | 3/1984 | Philipp | |
| 4,475,151 A | 10/1984 | Philipp | |
| 4,497,575 A | 2/1985 | Philipp | |
| 4,736,097 A | 4/1988 | Philipp | |
| 4,736,191 A * | 4/1988 | Matzke et al. | 345/174 |
| 4,773,024 A | 9/1988 | Faggin et al. | |
| 4,802,103 A | 1/1989 | Faggin et al. | |
| 4,876,534 A | 10/1989 | Mead et al. | |
| 4,879,461 A | 11/1989 | Philipp | |
| 4,935,702 A | 6/1990 | Mead et al. | |
| 4,953,928 A | 9/1990 | Anderson et al. | |
| 4,962,342 A | 10/1990 | Mead et al. | |
| 5,049,758 A | 9/1991 | Mead et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |
| 5,083,044 A | 1/1992 | Mead et al. | |
| 5,095,284 A | 3/1992 | Mead | |
| 5,097,305 A | 3/1992 | Mead et al. | |
| 5,107,149 A | 4/1992 | Platt et al. | |
| 5,109,261 A | 4/1992 | Mead et al. | |
| 5,119,038 A | 6/1992 | Anderson et al. | |
| 5,120,996 A | 6/1992 | Mead et al. | |
| 5,122,800 A | 6/1992 | Philipp | |
| 5,126,685 A | 6/1992 | Platt et al. | |
| 5,146,106 A | 9/1992 | Anderson et al. | |
| 5,160,899 A | 11/1992 | Anderson et al. | |

(Continued)

OTHER PUBLICATIONS

Sedra, Adel S. et al., "Microelectronic Circuits," 3rd Edition, Oxford University Press, pp. xiii-xx and 861-883, 1991.

(Continued)

*Primary Examiner*—Andrew H. Hirshfeld
*Assistant Examiner*—Timothy J. Dole
(74) *Attorney, Agent, or Firm*—Blakely Sokoloff Taylor & Zafman LLP

(57) ABSTRACT

A technique for implementing a center key in a capacitive sense radial slider interface without use of center mechanical button. A user interaction with an array of capacitive sensors within the radial slider interface is sensed. It is determined whether at least a threshold number greater than one of the capacitive sensors within the array are concurrently actuated by the user interaction. A center key actuation is registered if at least the threshold number of the capacitive sensors are concurrently actuated.

20 Claims, 11 Drawing Sheets

U.S. PATENT DOCUMENTS

| | | |
|---|---|---|
| 5,165,054 A | 11/1992 | Platt et al. |
| 5,166,562 A | 11/1992 | Allen et al. |
| 5,204,549 A | 4/1993 | Platt et al. |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,289,023 A | 2/1994 | Mead |
| 5,303,329 A | 4/1994 | Mead et al. |
| 5,305,017 A | 4/1994 | Gerphide |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,374,787 A | 12/1994 | Miller et al. |
| 5,381,515 A | 1/1995 | Platt et al. |
| 5,384,467 A | 1/1995 | Plimon et al. |
| 5,408,194 A | 4/1995 | Steinbach et al. |
| 5,488,204 A | 1/1996 | Mead et al. |
| 5,495,077 A | 2/1996 | Miller et al. |
| 5,541,878 A | 7/1996 | LeMoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,629,891 A | 5/1997 | LeMoncheck et al. |
| 5,648,642 A | 7/1997 | Miller et al. |
| 5,682,032 A | 10/1997 | Philipp |
| 5,730,165 A | 3/1998 | Philipp |
| 5,757,368 A | 5/1998 | Gerpheide et al. |
| 5,763,909 A | 6/1998 | Mead et al. |
| 5,767,457 A | 6/1998 | Gerpheide et al. |
| 5,796,183 A | 8/1998 | Hourmand |
| 5,812,698 A | 9/1998 | Platt et al. |
| 5,841,078 A | 11/1998 | Miller et al. |
| 5,844,265 A | 12/1998 | Mead et al. |
| 5,854,625 A | 12/1998 | Frisch et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,880,411 A | 3/1999 | Gillespie et al. |
| 5,889,236 A | 3/1999 | Gillespie et al. |
| 5,914,465 A | 6/1999 | Allen et al. |
| 5,914,708 A | 6/1999 | LaGrange et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,969,513 A | 10/1999 | Clark |
| 6,023,422 A | 2/2000 | Allen et al. |
| 6,028,271 A | 2/2000 | Gillespie et al. |
| 6,028,959 A | 2/2000 | Wang et al. |
| 6,097,432 A | 8/2000 | Mead et al. |
| 6,148,104 A | 11/2000 | Wang et al. |
| 6,185,450 B1 | 2/2001 | Seguine et al. |
| 6,188,228 B1 | 2/2001 | Philipp |
| 6,188,391 B1 | 2/2001 | Seely et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,280,391 B1 | 8/2001 | Olson et al. |
| 6,288,707 B1 | 9/2001 | Philipp |
| 6,304,014 B1 | 10/2001 | England et al. |
| 6,320,184 B1 | 11/2001 | Winklhofer et al. |
| 6,323,846 B1 | 11/2001 | Westerman et al. |
| 6,326,859 B1 | 12/2001 | Goldman et al. |
| 6,377,009 B1 | 4/2002 | Philipp |
| 6,380,929 B1 | 4/2002 | Platt |
| 6,380,931 B1 | 4/2002 | Gillespie et al. |
| 6,414,671 B1 | 7/2002 | Gillespie et al. |
| 6,430,305 B1 | 8/2002 | Decker |
| 6,441,073 B1 | 8/2002 | Tanaka et al. |
| 6,452,514 B1 | 9/2002 | Philipp |
| 6,457,355 B1 | 10/2002 | Philipp |
| 6,466,036 B1 | 10/2002 | Philipp |
| 6,473,069 B1 | 10/2002 | Gerpheide |
| 6,489,899 B1 | 12/2002 | Ely et al. |
| 6,498,720 B2 | 12/2002 | Glad |
| 6,499,359 B1 | 12/2002 | Washeleski et al. |
| 6,522,128 B1 | 2/2003 | Ely et al. |
| 6,523,416 B2 | 2/2003 | Takagi et al. |
| 6,534,970 B1 | 3/2003 | Ely et al. |
| 6,535,200 B2 | 3/2003 | Philipp |
| 6,570,557 B1 | 5/2003 | Westerman et al. |
| 6,587,093 B1 | 7/2003 | Shaw et al. |
| 6,610,936 B2 | 8/2003 | Gillespie et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,705,511 B1 | 3/2004 | Dames et al. |
| 6,714,817 B2 | 3/2004 | Daynes et al. |
| 6,730,863 B1 | 5/2004 | Gerpheide et al. |
| 6,750,852 B2 | 6/2004 | Gillespie et al. |
| 6,788,221 B1 | 9/2004 | Ely et al. |
| 6,798,218 B2 | 9/2004 | Kasperkovitz |
| 6,809,275 B1 | 10/2004 | Cheng et al. |
| 6,856,433 B2 | 2/2005 | Hatano et al. |
| 6,873,203 B1 | 3/2005 | Latham, II et al. |
| 6,888,538 B2 | 5/2005 | Ely et al. |
| 6,893,724 B2 | 5/2005 | Lin et al. |
| 6,969,978 B2 | 11/2005 | Dening |
| 6,975,123 B1 | 12/2005 | Malang et al. |
| 7,046,230 B2 * | 5/2006 | Zadesky et al. ............ 345/173 |
| 7,119,550 B2 | 10/2006 | Kitano et al. |
| 2002/0063688 A1 | 5/2002 | Shaw et al. |
| 2002/0191029 A1 | 12/2002 | Gillespie et al. |
| 2003/0025679 A1 | 2/2003 | Taylor et al. |
| 2003/0062889 A1 | 4/2003 | Ely et al. |
| 2003/0063428 A1 | 4/2003 | Nishi |
| 2003/0080755 A1 | 5/2003 | Kobayashi |
| 2003/0156098 A1 | 8/2003 | Shaw et al. |
| 2003/0160808 A1 | 8/2003 | Foote et al. |
| 2003/0183864 A1 | 10/2003 | Miyazawa |
| 2003/0183884 A1 | 10/2003 | Miyazawa |
| 2003/0184315 A1 | 10/2003 | Eberlein |
| 2004/0169594 A1 | 9/2004 | Ely et al. |
| 2004/0178989 A1 * | 9/2004 | Shahoian et al. ............ 345/156 |
| 2004/0178997 A1 | 9/2004 | Gillespie et al. |
| 2004/0252109 A1 | 12/2004 | Trent, Jr. et al. |
| 2004/0263864 A1 | 12/2004 | Lukacs et al. |
| 2005/0021269 A1 | 1/2005 | Ely et al. |
| 2005/0024341 A1 | 2/2005 | Gillespie et al. |
| 2005/0052425 A1 * | 3/2005 | Zadesky et al. ............ 345/173 |
| 2005/0073302 A1 | 4/2005 | Hibbs et al. |
| 2005/0073322 A1 | 4/2005 | Hibbs et al. |
| 2005/0083110 A1 | 4/2005 | Latham, II et al. |
| 2006/0032680 A1 | 2/2006 | Elias et al. |
| 2006/0097991 A1 | 5/2006 | Hotelling et al. |
| 2006/0113974 A1 | 6/2006 | Kan et al. |
| 2006/0164142 A1 | 7/2006 | Stanley |

2006/0273804 A1    12/2006    Delorme et al.

OTHER PUBLICATIONS

Van Ess, David, "Simulating a 555 Timer with PSoC™," Cypress Semiconductor Corporation, Application Note AN2286, pp. 1-10, May 19, 2005.

Cypress Semiconductor Corporation, "FAN Controller CG6457AM and CG6462AM," PSoC™ Mixed-Signal Array Preliminary Data Sheet, pp. 1-25, May 24, 2005.

Cypress Semiconductor Corporation, "PsoC Mixed-Signal Controllers," Product Description, pp. 1-2, http://www.cypress.com/portal/server.pt?space=CommunityPage&control=SetCommunity&CommunityID=209&PageID=215&gid=13&fid=24&category=false.

Cypress Semiconductor Corporation, "CY8C21x34 Data Sheet," CSR User Module, CSR V.1.0, Oct. 6, 2005, pp. 1-36.

Chapweske, Adam, "The PS/2 Mouse Interface," PS/2 Mouse Interfacing, 2001.

Cypress Semiconductor Corporation, "Cypress Introduces PSoC(TM)-Based Capacitive Touch Sensor Solution", Cypress Press Release, May 31, 2005, http://www.cypress.com/portal/server.pt?space=CommunityPage&control=Set Community&CommunityID =208&PageID=218&DirectoryID=661552 (Retrieved on Feb. 5, 2007).

Seguine, Ryan, "Layout Guidelines for PSoC™ CapSense™ ," Cypress Semiconductor Corporation, Application Note AN2292, pp. 1-10, Jul. 22, 2005.

Lee, Mark, "EMC Design considerations for PSoC™ CapSense™ Applications," Cypress Semiconductor Corporation, Apllication Note AN2318, pp. 1-6, Sep. 16, 2005.

Cypress Semiconductor Corporation, "Release Notes srn017," pp. 1-3, Jan. 24, 2007.

Cypress Semiconductor Corporation, "PSoC® CY8C20x34 Technical Reference Manual (TRM)," PSoC Cy8C20x34 TRM, Version 1.0, pp. 1-218, 2006.

\* cited by examiner

CENTER KEY ACTUATION
(WITHOUT MECHANICAL BUTTONS)

CENTER KEY ACTUATION
(WITH OFF-CENTER MECHANICAL BUTTONS)

UNINTERRUPTED RADIAL CAPACITIVE SENSE INTERFACE

TECHNICAL FIELD

This disclosure relates generally to user interface devices, and in particular but not exclusively, relates to capacitive sense user interface devices.

BACKGROUND INFORMATION

Computing devices, such as notebook computers, personal data assistants ("PDAs"), and mobile handsets, have user interface devices, which are also known as human interface devices ("HID"). One type of user interface device that has become more common is a capacitive sense interface. This technology is often referred to as capacitive touch-sense technology; however, this term is a misguided term since the user need not actually physically touch the interface to operate the technology. Rather, the user need only bring a conductive object (e.g., a finger) in close proximity to the capacitive sense interface.

Capacitive sense interfaces may assume a variety of shapes and sizes. FIG. 1 illustrates a conventional circular slider interface 105 having a center mechanical button 110. The illustrated circular slider interface 105 includes eight radial capacitive sensors 115 encircling a mechanical button 110 and an attached processing device 120. The radial capacitive sensors 115 are grouped in an annulus shape about mechanical button 110. Radial capacitive sensors 115 are electrically isolated and spatially distinct from mechanical button 110. Processing device 120 monitors capacitive changes in each of radial capacitive sensors 115 to register user interactions with circular slider interface 105. Processing device 120 may also monitor mechanical button 110 to register a mechanical actuation.

Circular sliders may be used to convey absolute positional information of a conductive object, such as to emulate a mouse in controlling cursor positioning on a display or to emulate a scrolling function of a mouse. Circular sliders may also be used to actuate one or more functions associated with various sensing elements of the circular slider.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a method, apparatus, and system for implementing a center key on a radial capacitive sense interface without a distinct center mechanical button are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
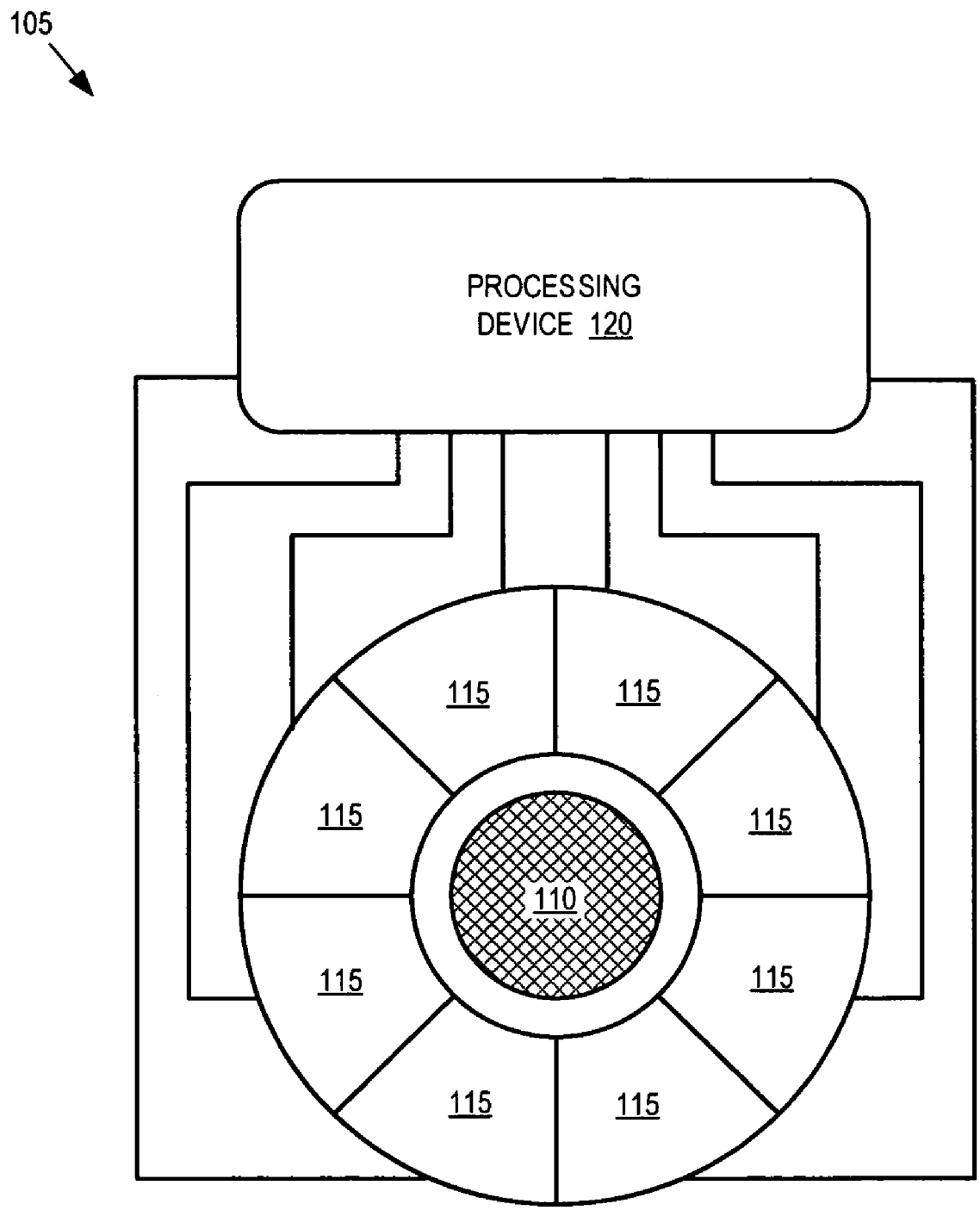
FIG. 1 illustrates a conventional circular slider interface having a center mechanical button.
Figure 2:
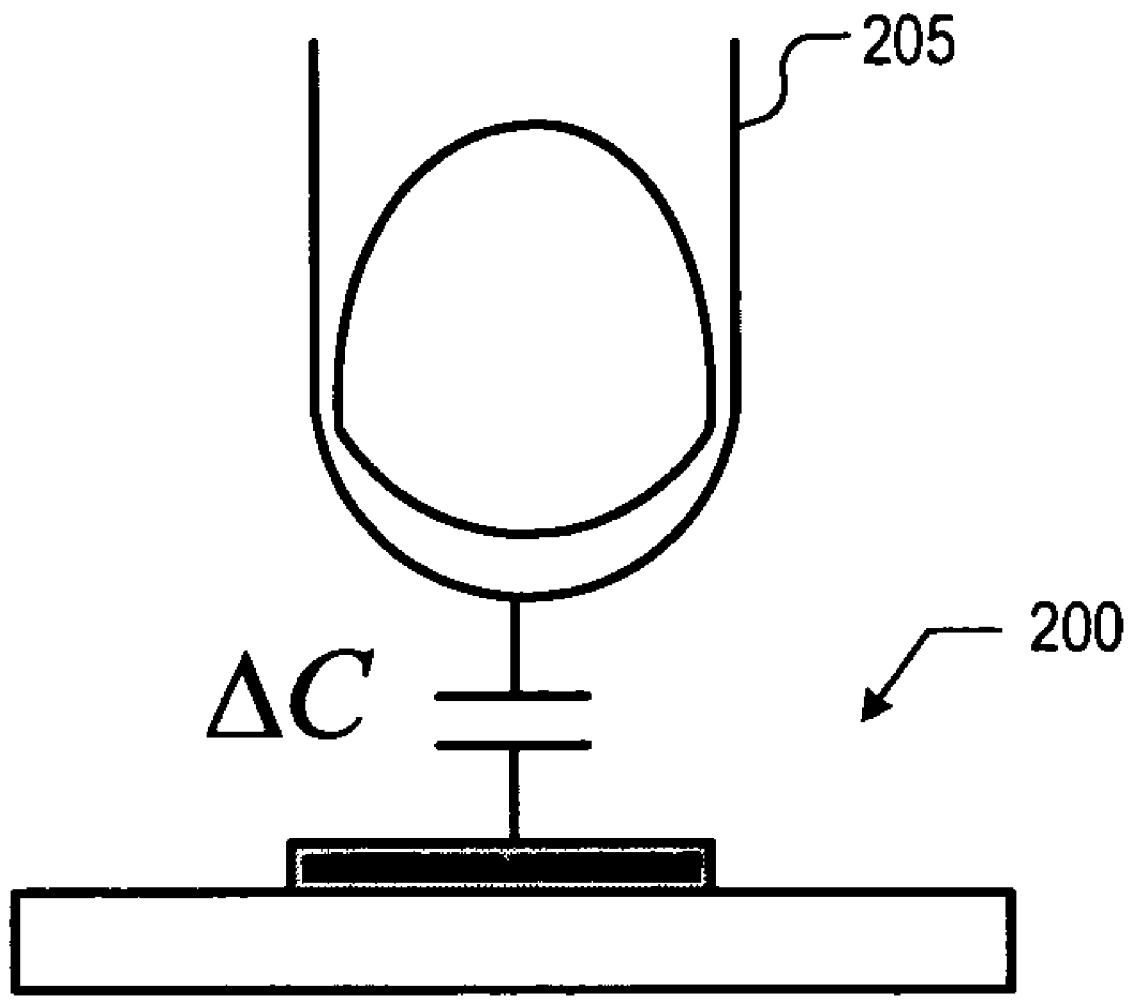
FIG. 2 illustrates a user finger interacting with a capacitive sensor.

FIG. 2 illustrates how capacitive sensors operate. FIG. 2 illustrates a user finger 205 interacting with a capacitive sensor 200. When a conductive object, such as user finger 205, is moved into proximity with capacitive sensor 200, its baseline capacitance is increased, resulting in a measurable capacitance change. By monitoring capacitive sensor 200 for a baseline capacitance deviation ΔC, capacitive sensor activations can be determined and registered within software. Of course, a user interaction with capacitive sensor 200 is not limited to a finger. Other conductive objects may be used to interact with capacitive sensor 200 including, a stylus, a pen, or any other conductive object.

By grouping a plurality of capacitance sensors 200 into an array of capacitive sensors, such as a radial slider array, a linear slider array, a planar touch pad array, or the like, a variety of user interfaces may be implemented. For example, capacitive sensor arrays may be used to implement user interfaces of a variety of products including: door switches, white goods (e.g., kitchen appliances), laptop computers, desktop computers, personal digital assistants ("PDAs"), portable music players (e.g., MP3 players), wireless telephones, cellular telephones, radios, or the like. Capacitive sensor arrays may also be used to implement position sensors.

Figure 3A:
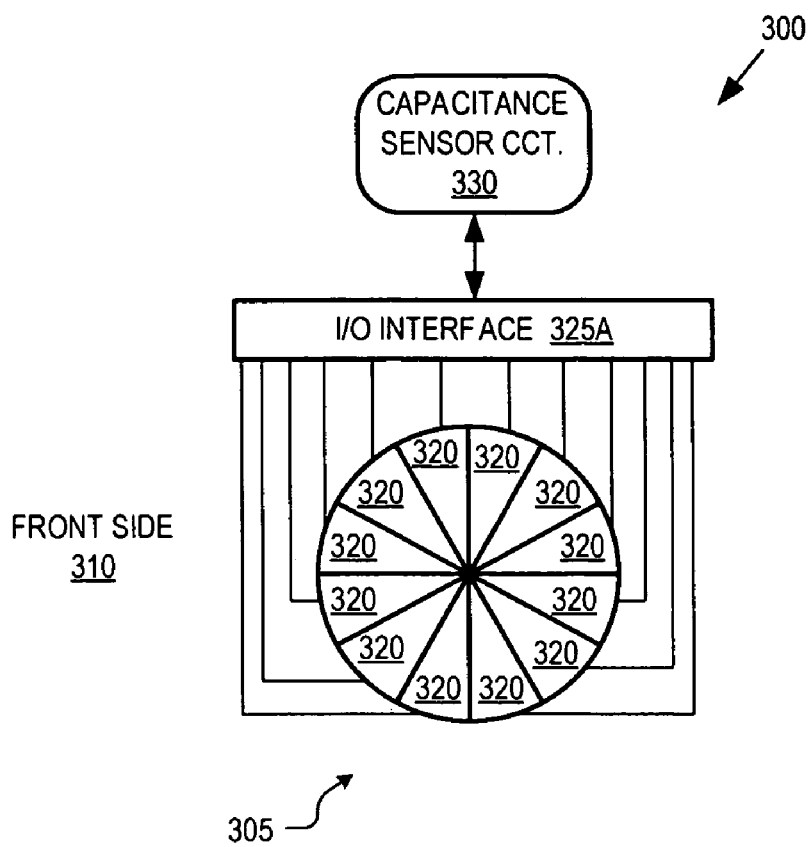
FIG. 3A is a block diagram illustrating a front side of a radial slider array of a radial capacitive sense interface, in accordance with an embodiment of the invention.
Figure 3B:
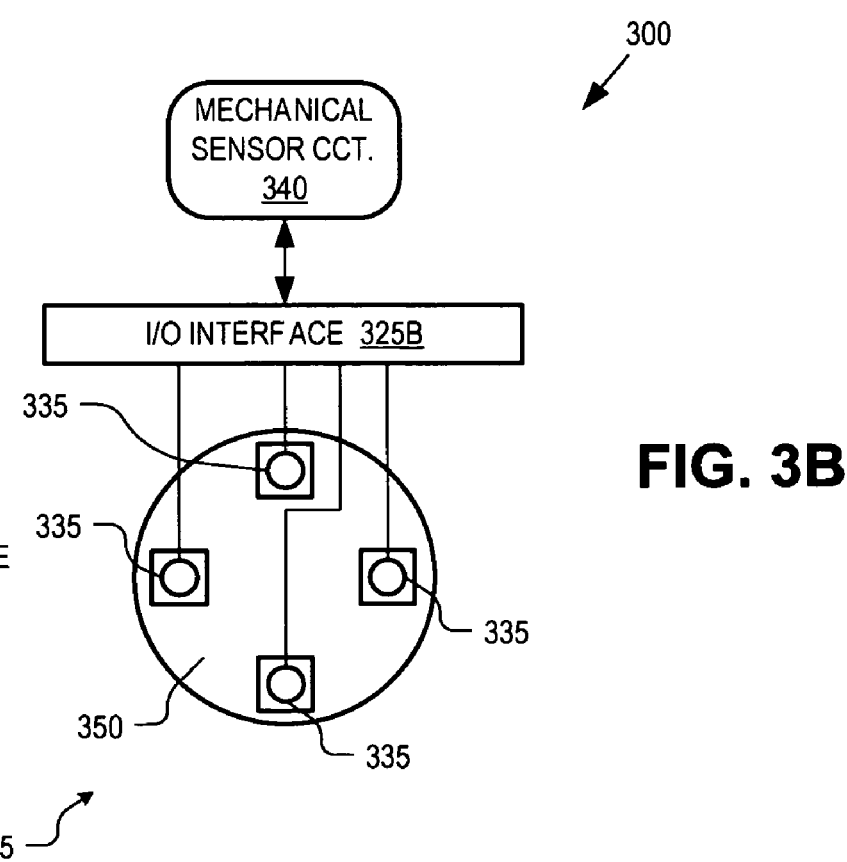
FIG. 3B is a block diagram illustrating a backside of a radial slider array of a radial capacitive sense interface, in accordance with an embodiment of the invention.

FIGS. 3A and 3B illustrate a radial capacitive sense ("CAP-sense") interface 300 with a radial slider array 305, in accordance with an embodiment of the invention. FIG. 3A illustrates a front side 310 of radial slider array 305, while FIG. 3B illustrates a back side 315 of radial slider array 305. The illustrated embodiment of radial CAP-sense interface 300 includes CAP sensors 320, input/output ("I/O") interfaces 325A and 325B (collectively 325), a capacitance sensor circuit 330, off-center mechanical buttons 335, and a mechanical sensor circuit 340.

The illustrated embodiment of radial slider array 305 includes CAP sensors 320 as being uninterrupted CAP sensors that radially extend all the way to the center of radial slider array 305, without interruption. It is noteworthy that the illustrated embodiments of CAP sensors 320 are not oriented within an annulus shape encircling a center mechanical button; however, embodiments may include a small center portion cut out so CAP sensors 320 do not electrically short. Rather, the illustrated embodiment of radial slider array 305 implements the functionality of a center mechanical button with CAP sensors 320, and in some embodiments, in connection with off-center mechanical buttons 335. Activation of this pseudo-center button is referred to herein as registering a "center key activation".

Radial slider array 305 is illustrated as a perfect circle; however, embodiments of radial slider array 305 need not be perfect circles. In fact, some embodiments may assume irregular circular-like shapes including an oval, an ellipse, or other more irregular shapes with multiple radial curvatures at different radial positions.

I/O interface 325A links each CAP sensor 320 to capacitance sensor circuit 330. Similarly, I/O interface 325B links each off-center mechanical button 335 to mechanical sensor circuit 340. In one embodiment, I/O interfaces 325A and 325B may be implemented with a single I/O interface that couples to both capacitance sensor circuit 330 and mechanical sensor circuit 340. In another embodiment, I/O interfaces 325A and 325B are distinct interfaces.

In one embodiment, I/O interface 325A is a configurable analog interconnect between capacitance sensor circuit 330 and radial slider array 305. I/O interface 325A can be configured on the fly during regular operation to couple capacitance sensor circuit 330 to any one individual CAP sensor 320 at a time or to groups of CAP sensors 320 at a time. Once connected to an individual CAP sensor 320 or to a group of CAP sensors 320, capacitive sensor circuit 330 can measure the capacitance of CAP sensors 320 to determine whether its/their capacitance has deviated by a threshold amount for a threshold period of time, thus indicating that a user activation should be registered in software (i.e., acknowledged in software such that an appropriate action or function is executed).

In one embodiment, CAP sensor circuit 330 includes driver circuitry of a relaxation oscillator. In this embodiment, the driver circuitry within CAP sensor circuit 330 continually charges and discharges each CAP sensor 320 by reciprocally driving and discharging a current onto CAP sensors 320. When I/O interface 325A connects the driver circuitry to a particular CAP sensor 320 (or a group of CAP sensors 320), the relaxation oscillator circuit is formed. The capacitance of the particular CAP sensor 320 connected determines the frequency at which the relaxation oscillator circuit will oscillate. To measure a capacitive change AC of a CAP sensor 320, capacitance sensor circuit 330 measures either a frequency change or period change of the oscillation associated with a particular CAP sensor 320 from a baseline value. CAP sensor circuit 330 need not actually measure the absolute capacitance of a CAP sensor 320 to register an actuation, but rather can measure a value indicative of this capacitance. This value may be a simple count deviation from a baseline unactuated count value related to the period or frequency of oscillation. It should be appreciated that CAP sensor circuit 330 may be implemented with a variety of other capacitive sense technologies including a current versus voltage phase shift measurement technique, a resistor-capacitor charge timing technique, a capacitive bridge divider technique, a charge transfer technique, or the like, described in greater detail below.

Once CAP sensor circuit 330 senses that one or more CAP sensors 320 are being actuated (e.g., threshold change in a baseline capacitance for a threshold duration), then the physical location of the user interaction on radial slider array 305 may be determined by analyzing the values measured by CAP sensor circuit 330 to determine which CAP sensors 320 are being actuated.

I/O interface 325B links each off-center mechanical button 335 to mechanical sensor circuit 340. Mechanical buttons 335 may be typical dome switches that provide force feedback to the user in the form of a spring with an audible "click" noise when actuated. Mechanical sensor circuit 340 is coupled via I/O interface 325B to sense actuations of off-center mechanical buttons 335 and provide a signal to software, which can then register (i.e., acknowledge) the actuation. FIG. 3B illustrates off-center mechanical buttons 335 disposed in the "cardinal positions" to implement up, down, left, and right functions. In other embodiments, off-center mechanical buttons 335 may be positioned in other off-center locations, and may include fewer or more buttons. In some embodiments, CAP-sense interface 300 need not even include off-center mechanical buttons 335 or I/O interface 325B.

In the illustrated embodiment, CAP sensors 320 are disposed on a top side 310 of a circularly shaped rigid substrate 350, while off-center mechanical buttons 335 are disposed on backside 315 of rigid substrate 350. In one embodiment, rigid substrate 350 is a printed circuit board ("PCB"). In one embodiment, capacitance sensor circuit 330 and mechanical sensor circuit 340 are embodied within one or more integrated circuits that are disposed on backside 315 of rigid substrate 350 along side off-center mechanical buttons 335. In other embodiments, capacitance sensor circuit 330 and mechanical sensor circuit 340 are embodied within one or more integrated circuits electrically coupled to radial slider array 305, but remotely located off rigid substrate 350.

Figure 4:
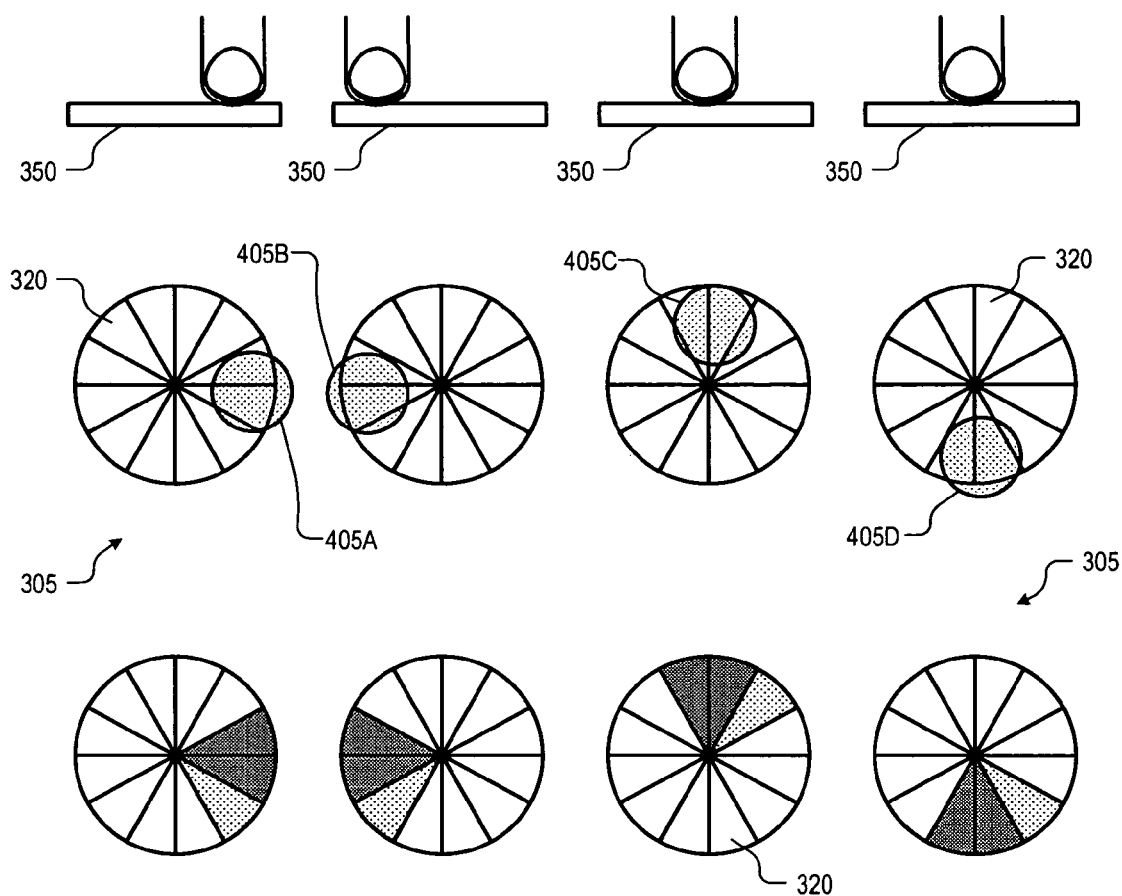
FIG. 4 is a diagram illustrating capacitive position and scroll operation of a radial capacitive sense interface, in accordance with an embodiment of the invention.

FIG. 4 is a diagram illustrating capacitive position and scroll operation of CAP-sense interface 300, in accordance with an embodiment of the invention. FIG. 4 illustrates columns 1-4, each illustrating, respective, user interactions 405A, 405B, 405C, and 405D with radial slider array 305. FIG. 4 illustrates side views of rigid substrate 350 that does not include off-center mechanical buttons 335 disposed thereon. Note, only a portion of some elements are labeled so as not to clutter the drawings.

Column 1 illustrates a user finger generating a user interaction 405A with radial slider array 305. User interaction 405A is positioned on the right side of radial slider array 305 and actuates three CAP sensors 320 (illustrated with shading). User interaction 405A substantially overlaps two CAP sensors 320 (illustrated with the darkest shading) and therefore capacitance sensor circuit 330 will measure the greatest capacitance deviation AC for these two CAP sensors 320. User interaction 405A marginally overlaps another CAP sensor 320 (illustrated with lighter shading) and therefore capacitance sensor circuit 330 will measure a smaller capacitance deviation AC for this CAP sensor 320. Although user interaction 405A only marginally overlaps the lightly shaded CAP sensor 320, the degree of interaction is still sufficient for capacitance sensor circuit 330 to sense an actuation of this CAP sensor 320.

Columns 2, 3, and 4 illustrate similar positional user interactions as column 1. Column 2 illustrates user interaction 405B positioned on a left side of radial slider array 305. Column 3 illustrates user interaction 405C positioned on an upper side of radial slider array 305. Column 4 illustrates user interaction 405D positioned on a lower side of radial slider array 305.

By monitoring the capacitance deviations AC on CAP sensors 320, the position of a user interaction with radial slider array 305 can be determined. Scroll operation may be effected when the user interaction is slid around radial slider array 305. Software entities may measure the rate of the sliding motion to translate the sliding motion into a variable speed scrolling function.

Figure 5:
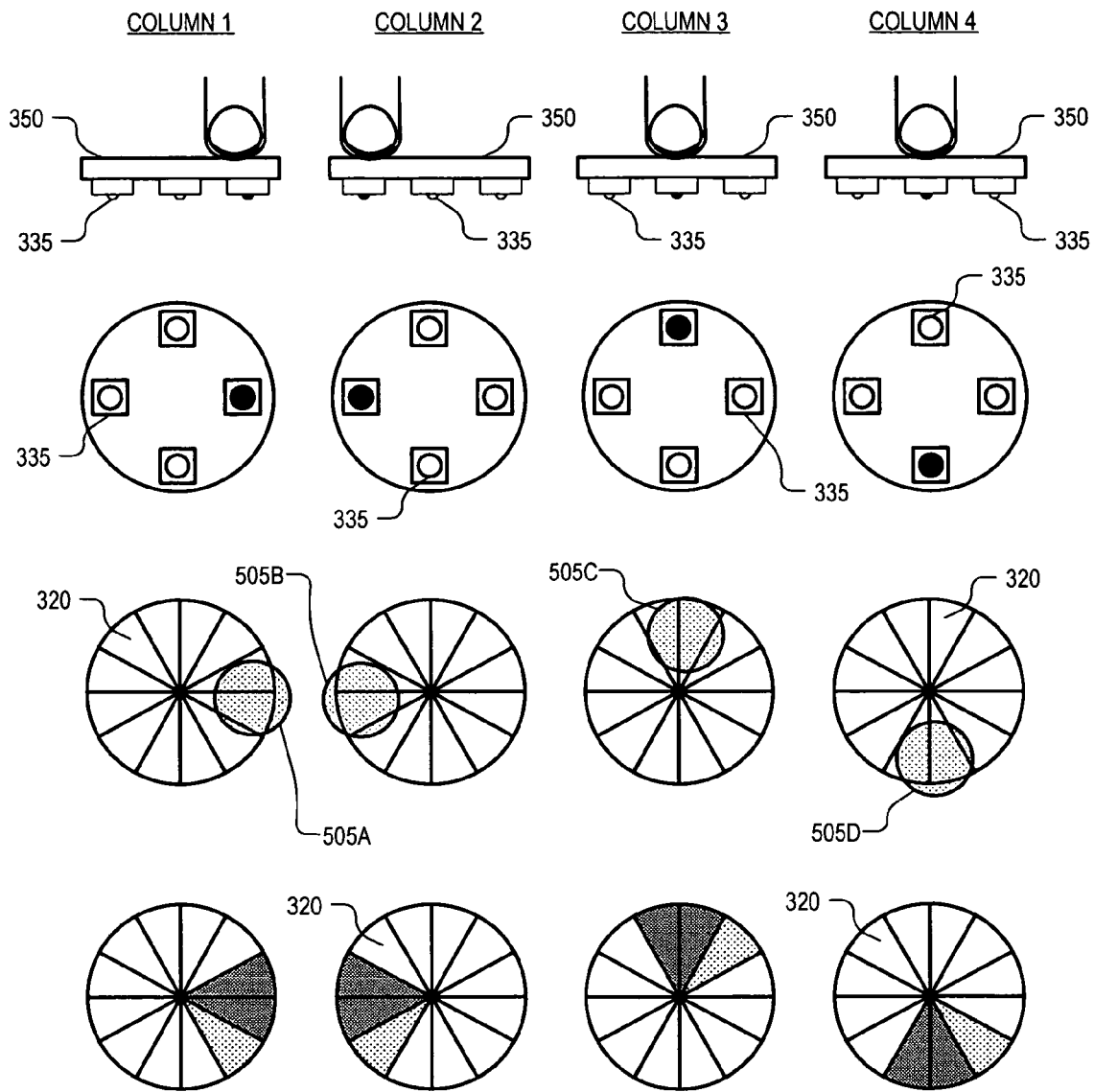
FIG. 5 is a diagram illustrating mechanical button operation of a radial capacitive sense interface, in accordance with an embodiment of the invention.

FIG. 5 is a diagram illustrating mechanical button operation of radial CAP-sense interface 300, in accordance with an embodiment of the invention. FIG. 5 illustrates columns 1-4, each illustrating, respective, user interactions 505A, 505B, 505C, and 505D with radial slider array 305. FIG. 5 illustrates side views of rigid substrate 350 that include off-center mechanical buttons 335 disposed thereon.

FIG. 5 illustrates how a user finger applies a force to front side 310 of radial slider array 305 at an interaction location. The force is translated through substrate 350, causing one or more of off-center mechanical buttons 335 disposed on backside 315 of rigid substrate 350 to be actuated. Column 1 illustrates a user finger applying a force to front side 310 of radial slider array 305 at an interaction location 505A. Interaction location 505A is positioned on the right side of radial slider array 305 and actuates three CAP sensors 320 (illustrated with shading). The force is also translated through substrate 350 to the off-center mechanical button 335 located on the right (illustrated with black shading).

Columns 2, 3, and 4 illustrate similar actuations of other off-center mechanical buttons 335, as column 1. Column 2 illustrates user interaction 505B positioned on a left side of radial slider array 305 to actuate the left mechanical button. Column 3 illustrates user interaction 505C positioned on a upper side of radial slider array 305 to actuate the upper mechanical button. Column 4 illustrates user interaction 505D positioned on a lower side of radial slider array 305 to actuate the lower mechanical button. Accordingly, applying a force to front side 310 of radial slider array 305 to trigger an actuation of off-center mechanical buttons 335, includes the side effect of actuating one or more CAP sensors 320 coincident or partially coincident with the location where the user applies the actuation force.

Figure 6:
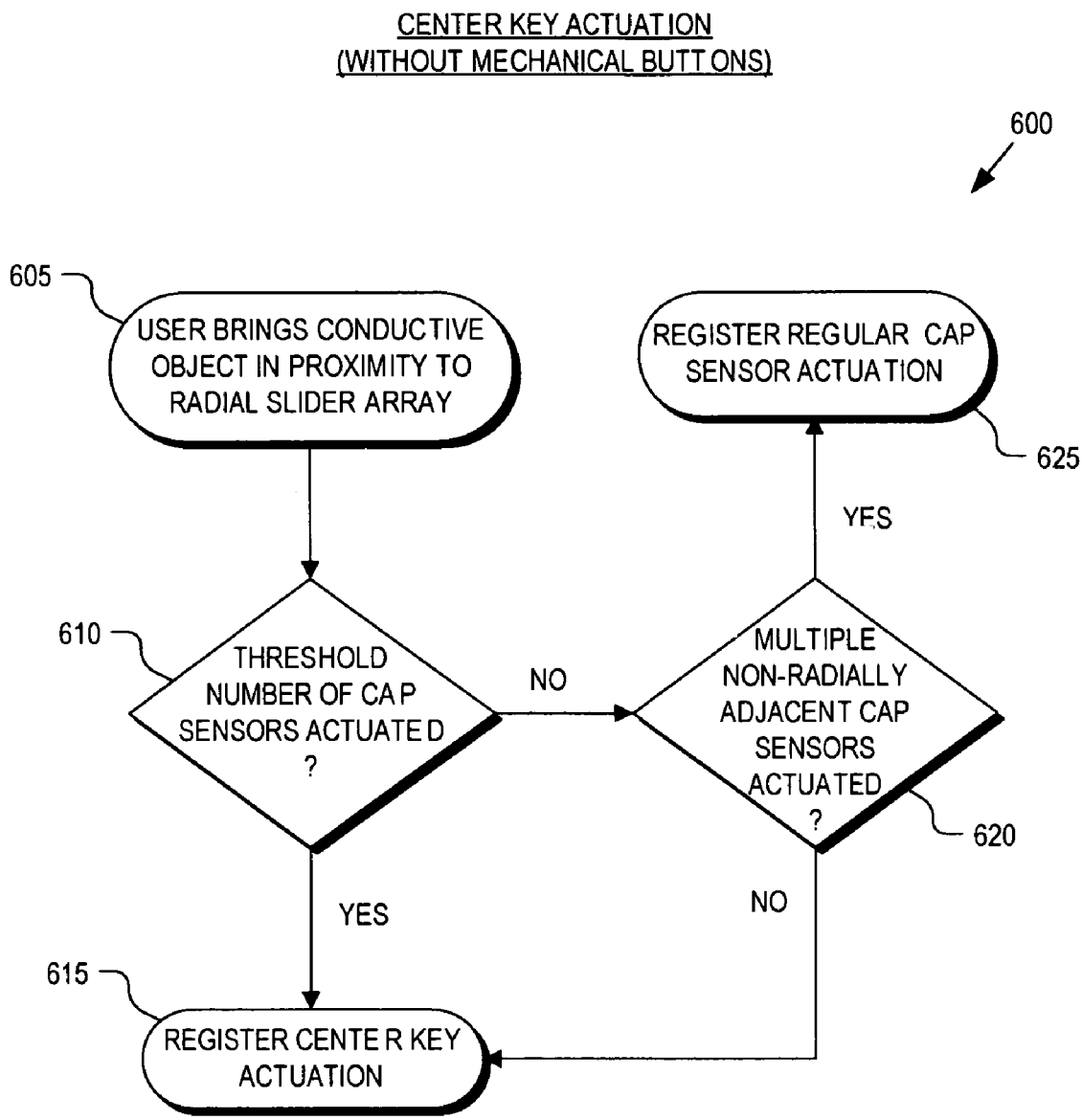
FIG. 6 is a flow chart illustrating a process for registering a center key actuation without aid of mechanical buttons, in accordance with an embodiment of the invention.

FIG. 6 is a flow chart illustrating a process 600 for registering a center key actuation on radial slider array 305 without aid of mechanical buttons, in accordance with an embodiment of the invention. The order in which some or all of the process blocks appear in each process should not be deemed limiting. Rather, one of ordinary skill in the art having the benefit of the present disclosure will understand that some of the process blocks may be executed in a variety of orders not illustrated.

Figure 7A:
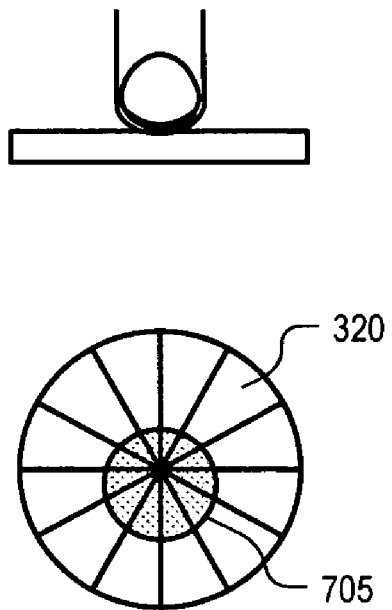
FIG. 7A is a block diagram illustrating a center key actuation using radial capacitive sensors without aid of a center mechanical button, in accordance with an embodiment of the invention.
Figure 7B:
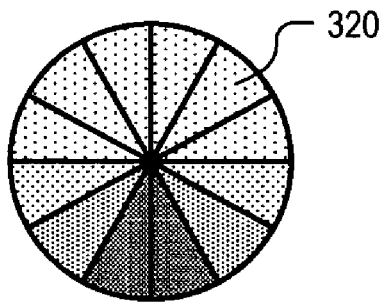
FIG. 7B is a block diagram illustrating a possible capacitive sensor actuation pattern for registering a center key actuation, in accordance with an embodiment of the invention.
Figure 7B:
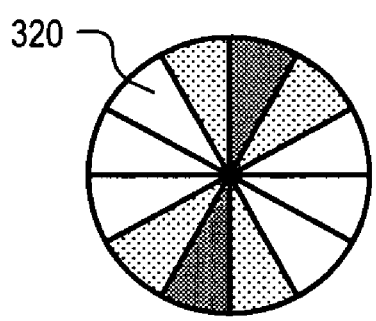
Figure 7C:
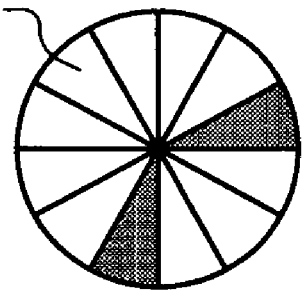
FIG. 7C is a block diagram illustrating another possible capacitive sensor actuation pattern for registering a center key actuation, in accordance with an embodiment of the invention.

Process 600 is described with reference to FIGS. 7A, 7B, and 7C. FIGS. 7A, 7B, and 7C each illustrate possible CAP sensor actuation patterns for registering a center key actuation, as opposed to a simple actuation of CAP sensors 320 for positional or scrolling operations.

In a process block 605, a user interacts with radial CAP-sense interface 300 by bring a conductive object (e.g., user's finger) in proximity to front side 310 of slider array 305. FIG. 7A illustrates one possible physical location 705 of a user interaction with radial slider array 305.

The user interaction at location 705 may cause capacitance sensor circuit 330 to sense a number of concurrent actuations of CAP sensors 320, as illustrated by the shading. Note, the darker shading connotes a greater capacitance change AC for the particular CAP sensor 320 from its baseline capacitance, which is related to its degree of coincidence with location 705. Similarly, lighter shading connotes smaller capacitance changes AC for the particular CAP sensor 320.

In a decision block 610, if the number of CAP sensors 320 concurrently actuated is greater than a threshold number, then a center key actuation is registered (process block 615). Registering an actuation is equivalent to software/firmware acknowledging or accepting that a center key actuation event has occurred. The threshold number may be equal to two or more concurrently actuated CAP sensors 320. In one embodiment, the threshold number is equal to at least three CAP sensors 320 within radial slider array 305 being concurrently actuated. In other embodiments, the threshold number may be greater or smaller as a proportion of all CAP sensors 320.

It should be appreciated that other conditions, than just a threshold number of concurrent actuations of CAP sensor 320 may be used to determine whether a user intended to initiate a center key actuation. These other conditions are referred to herein as secondary conditions, while the determination of a threshold number of concurrent actuation is referred to herein as the primary condition. Secondary conditions may be alternative conditions used instead of the primary condition, or may be used in addition to the primary condition. Furthermore, the secondary conditions may be implemented using an inclusive (or exclusive) logical OR between the primary condition and one or more secondary conditions. In yet another embodiment, the primary condition could be logically AND'd with one or more secondary conditions to register a center key actuation.

Returning to decision block 610 (the primary condition), a secondary condition is logically OR'd to decision block 610. If there are not a threshold number of concurrently actuated CAP sensors 320, then process 600 continues to a decision block 620 (a secondary condition). In decision block 620, if multiple non-radially adjacent CAP sensors 320 are concurrently actuated, then a center key actuation is registered in process block 615. Otherwise, process 600 continues to a process block 625 where a regular actuation of one of CAP sensors 320 is registered.

FIG. 7A illustrates a typical actuation pattern where at least a threshold number of CAP sensors 320 are concurrently actuated by a user interaction 705. Although user interaction 705 is not perfectly centered on radial slider array 305, a center key actuation will still result since a large portion of CAP sensors 320 are actuated. As illustrated, since the user did not touch radial slider array 305 directly in the middle, capacitance sensor circuit 330 will measure varying capacitance deviations for each CAP sensor 320. In one embodiment, software algorithms can analyze the variations in the capacitance deviations of multiple concurrent actuations of CAP sensors 320 to discern typical center key activation patterns, and therefore determine with a greater degree of reliability, as to whether a user intended to trigger a center key actuation.

FIGS. 7B and 7C illustrate other actuation patterns that could trigger a center key actuation. Both actuation patterns include concurrently actuated CAP sensors 320 that are physically non-radially adjacent and radially separated by intervening unactuated CAP sensors 320. Other actuation patterns may be used to determine a center key actuation, as well.

Figure 8:
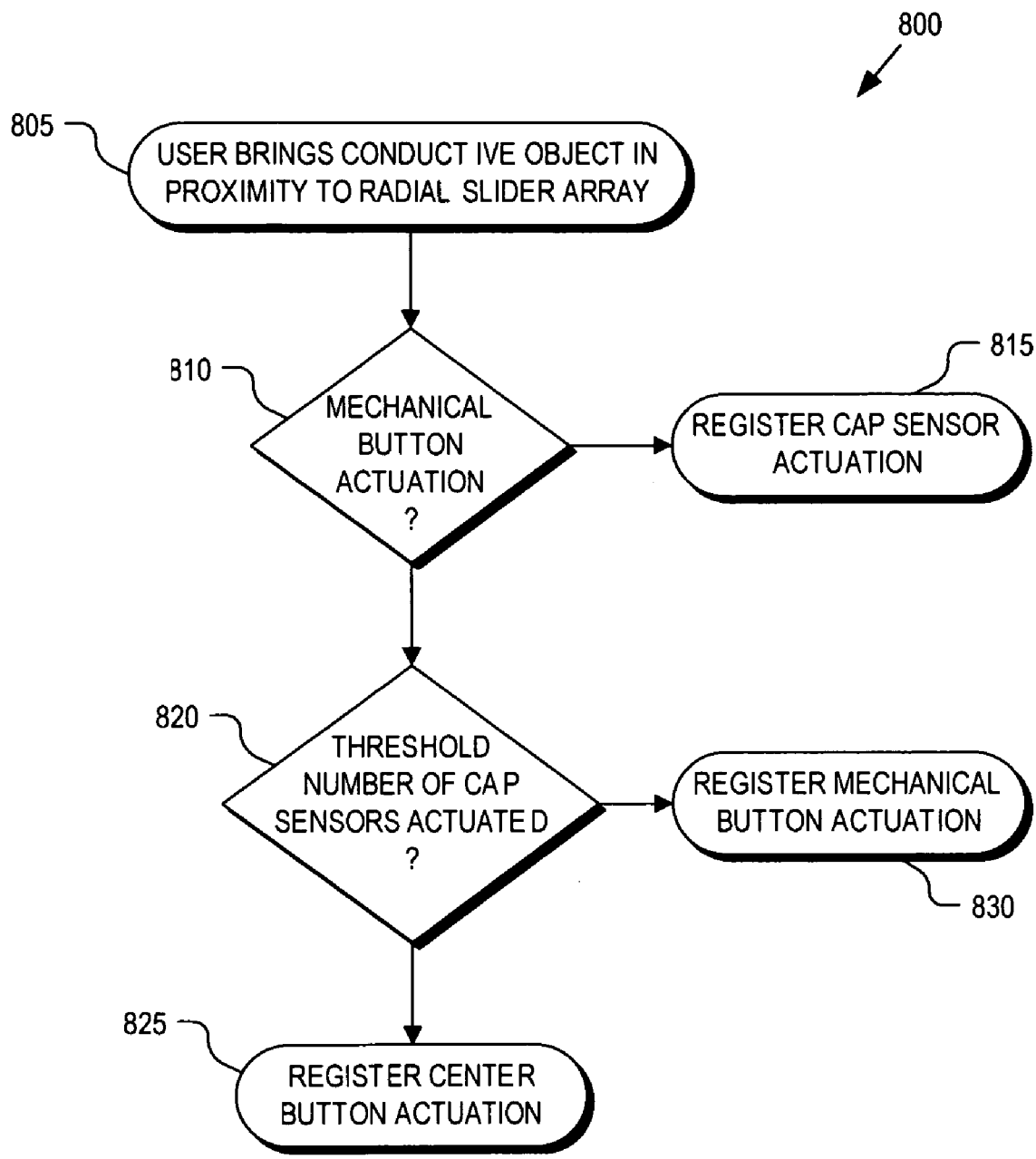
FIG. 8 is a flow chart illustrating a process for registering a center key actuation with aid of off-center mechanical buttons, in accordance with an embodiment of the invention.

FIG. 8 is a flow chart illustrating a process 800 for registering a center key actuation with aid of off-center mechanical buttons 335, in accordance with an embodiment of the invention. Process 800 is described with reference to FIG. 9.

Figure 9:
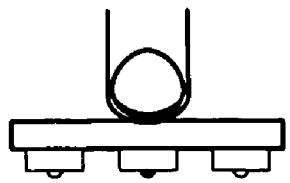
FIG. 9 is a block diagram illustrating a center key actuation using radial capacitive sensors with aid of off-center mechanical buttons, in accordance with an embodiment of the invention.
Figure 9:
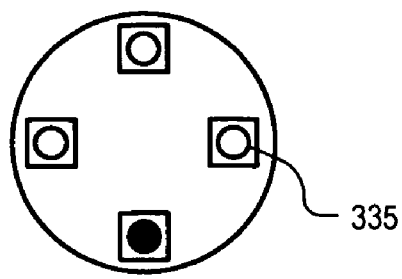
Figure 9:
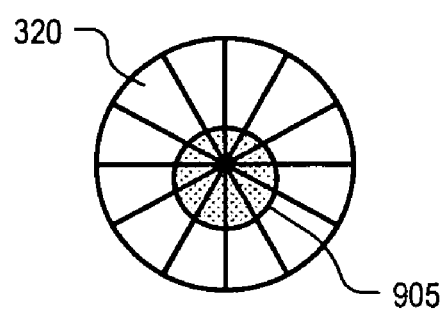
Figure 9:
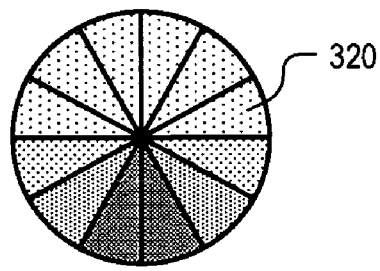

In a process block 805, a user interacts with radial CAP-sense interface 300 by bring a conductive object (e.g., user's finger) in proximity to front side 310 of slider array 305. FIG. 9 illustrates an example user interaction 905 with radial slider array 305.

In a decision block 810, it is determined whether one of off-center mechanical buttons 335 is actuated due to the user interaction. In other words, it is determined whether the user applied enough force to front side 310 to cause one or more off-center mechanical buttons 335 to actuate. If not, then a regular capacitive actuation of one or more CAP sensors 320 is registered (process block 815) for positional or scrolling purposes.

However, if one of off-center mechanical buttons 335 is actuated, then process 800 continues to a decision block 820. In decision block 820, it is determined whether user interaction 905 has actuated at least a threshold number of CAP sensors 320 concurrently. If yes, then a center key actuation is registered in process block 825. If no, then an activation of one of off-center mechanical buttons 335 is registered in process block 830. Similar threshold numbers and actuation patterns may be applied in process 800, as discuss above in connection with process 600. Furthermore, both primary and secondary conditions may be applied using logical AND or logical OR (inclusive or exclusive) functions. Process 800 operates similar to process 600, except the user must additionally apply enough force to front side 310 of radial slider array 305 to actuate one of off-center mechanical buttons 335. Accordingly, process 800 makes unintended center key actuations less likely.

Processes 600 and 800 illustrate techniques to implement the functionality of a center button (e.g., a center mechanical dome switch) without need of a physically distinct button or capacitance sensor designated for the purpose of a center button function. Since CAP sensors 320 are not constrained to reside in an annulus with a center portion cut out for a center button, CAP sensors 320 can extend all the way to the center and are therefore larger. A larger surface area for each CAP sensor 320 results in a more sensitive CAP-sense interface 300. Since CAP-sense interface 300 implements the same functionality of conventional circular slider interface 105 with fewer components, radial CAP-sense interface 300 may be less costly to manufacture. Eliminating a center mechanical button also eliminates one possible failure point in the design, since mechanical components tend to be more failure prone than electrical components. Finally, eliminating an electrically distinct center button or mechanical button, reduces the number of I/O ports required in I/O interface 325B.

Figure 10:
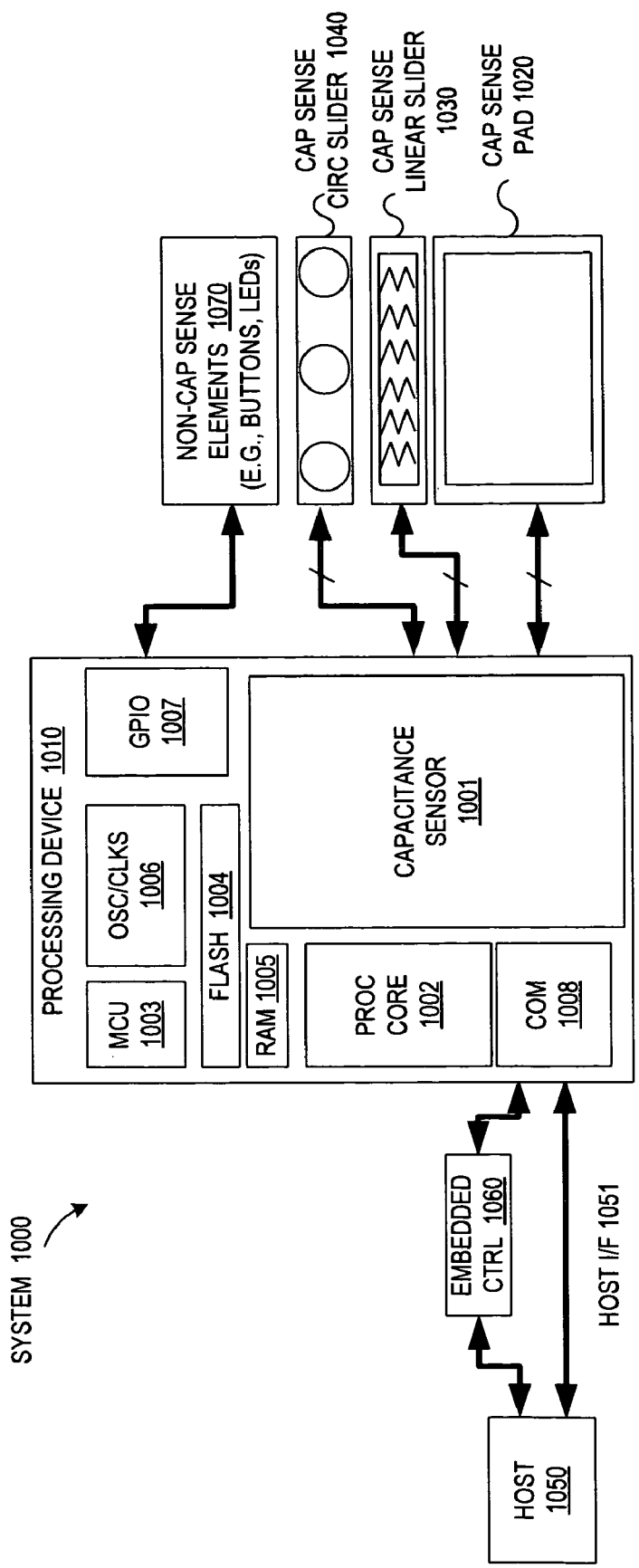
FIG. 10 is a functional block diagram illustrating a demonstrative processing system for implementing a capacitive sense user interface, in accordance with an embodiment of the invention.

FIG. 10 is a functional block diagram illustrating a demonstrative system 1000 for implementing a capacitance sense user interface, in accordance with an embodiment of the invention. System 1000 includes a processing device 1010, a capacitive sense pad 1020, a capacitive sense linear slider 1030, a capacitive sense radial slider 1040, a host processor 1050, an embedded controller 1060, and non-capacitance sensor elements 1070. Processing device 1010 may include analog and/or digital general purpose input/output ("GPIO") ports 1007. GPIO ports 1007 may be programmable. GPIO ports 1007 may be coupled to a Programmable Interconnect and Logic ("PIL"), which acts as an interconnect between GPIO ports 1007 and a digital block array of processing device 1010 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 1010 may also include memory, such as random access memory (RAM) 1005 and program flash 1004. RAM 1005 may be static RAM ("SRAM"), and program flash 1004 may be a non-volatile storage, which may be used to store firmware (e.g., control algorithms executable by processing core 1002 to implement operations described herein such as the aforementioned decision algorithm). Processing device 1010 may also include a memory controller unit ("MCU") 1003 coupled to memory and the processing core 1002.

Processing device 1010 may also include an analog block array (not illustrated). The analog block array is also coupled to the system bus. The analog block array also may be configured to implement a variety of analog circuits (e.g., ADC, analog filters, etc.) using, in one embodiment, configurable UMs. The analog block array may also be coupled to the GPIO 1007.

As illustrated, capacitance sensor 1001 may be integrated into processing device 1010. Capacitance sensor 1001 may include analog I/O (e.g., I/O interfaces 325) for coupling to an external component, such as capacitive sense pad 1020, capacitive sense linear slider 1030, capacitive sense radial slider 1040 (e.g., radial slider array 305), and/or other devices. Capacitance sensor 1001 is described in more detail below.

Processing device 1010 may include internal oscillator/clocks 1006 and communication block 1008. The oscillator/clocks block 1006 provides clock signals to one or more of the components of processing device 1010. Communication block 1008 may be used to communicate with an external component, such as a host processor 1050, via host interface (I/F) line 1051. Alternatively, processing device 1010 may also be coupled to embedded controller 1060 to communicate with the external components, such as host 1050. Interfacing to the host 1050 can be through various methods. In one exemplary embodiment, interfacing with the host 1050 may be done using a standard PS/2 interface to connect to embedded controller 1060, which in turn sends data to the host 1050 via low pin count (LPC) interface. In some instances, it may be beneficial for processing device 1010 to do both touch-sensor pad and keyboard control operations, thereby freeing up the embedded controller 1060 for other housekeeping functions. In another exemplary embodiment, interfacing may be done using a universal serial bus (USB)

interface directly coupled to host 1050 via host interface line 1051. Alternatively, processing device 1010 may communicate to external components, such as host 1050 using industry standard interfaces, such as USB, PS/2, inter-integrated circuit (I2C) bus, or system packet interfaces (SPI). Host 1050 and/or embedded controller 1060 may be coupled to processing device 1010 with a ribbon or flex cable from an assembly, which houses the sensing device and processing device.

In one embodiment, processing device 1010 is configured to communicate with embedded controller 1060 or host 1050 to send and/or receive data. The data may be a command or alternatively a signal. In an exemplary embodiment, system 1000 may operate in both standard-mouse compatible and enhanced modes. The standard-mouse compatible mode utilizes the HID class drivers already built into the Operating System (OS) software of host 1050. These drivers enable processing device 1010 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, processing device 1010 may be configured to communicate with embedded controller 1060 or host 1050, using non-OS drivers, such as dedicated touch-sensor pad drivers, or other drivers known by those of ordinary skill in the art.

Processing device 1010 may reside on a common carrier substrate such as, for example, an integrated circuit (IC) die substrate, a multi-chip module substrate, or the like. Alternatively, the components of processing device 1010 may be one or more separate integrated circuits and/or discrete components. In one exemplary embodiment, processing device 1010 may be a Programmable System on a Chip (PSoC™) processing device, manufactured by Cypress Semiconductor Corporation, San Jose, Calif. Alternatively, processing device 1010 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like. In an alternative embodiment, for example, processing device 1010 may be a network processor having multiple processors including a core unit and multiple microengines. Additionally, processing device 1010 may include any combination of general-purpose processing device(s) and special-purpose processing device(s).

Capacitance sensor 1001 may be integrated into the IC of processing device 1010, or alternatively, in a separate IC. Descriptions of capacitance sensor 1001 may be generated and compiled for incorporation into other integrated circuits. For example, behavioral level code describing capacitance sensor 1001, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1001.

In one embodiment, electronic system 1000 may be used in a notebook computer. Alternatively, system 1000 may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 1001 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The CSR may include physical, electrical, and software components. The physical component may include the physical switch itself, typically a pattern constructed on a printed circuit board ("PCB") with an insulating cover, a flexible membrane, or a transparent overlay. The electrical component may include an oscillator or other means to convert a changed capacitance into a measured signal. The electrical component may also include a counter or timer to measure the oscillator output. The software component may include detection, compensation, and decision software algorithms to convert the count value into a capacitive sensor detection decision.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in processing device 1010. The charge transfer may be conceptually similar to an R-C charging circuit. In this method, Cp is the capacitance being sensed and $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter.

Figure 11:
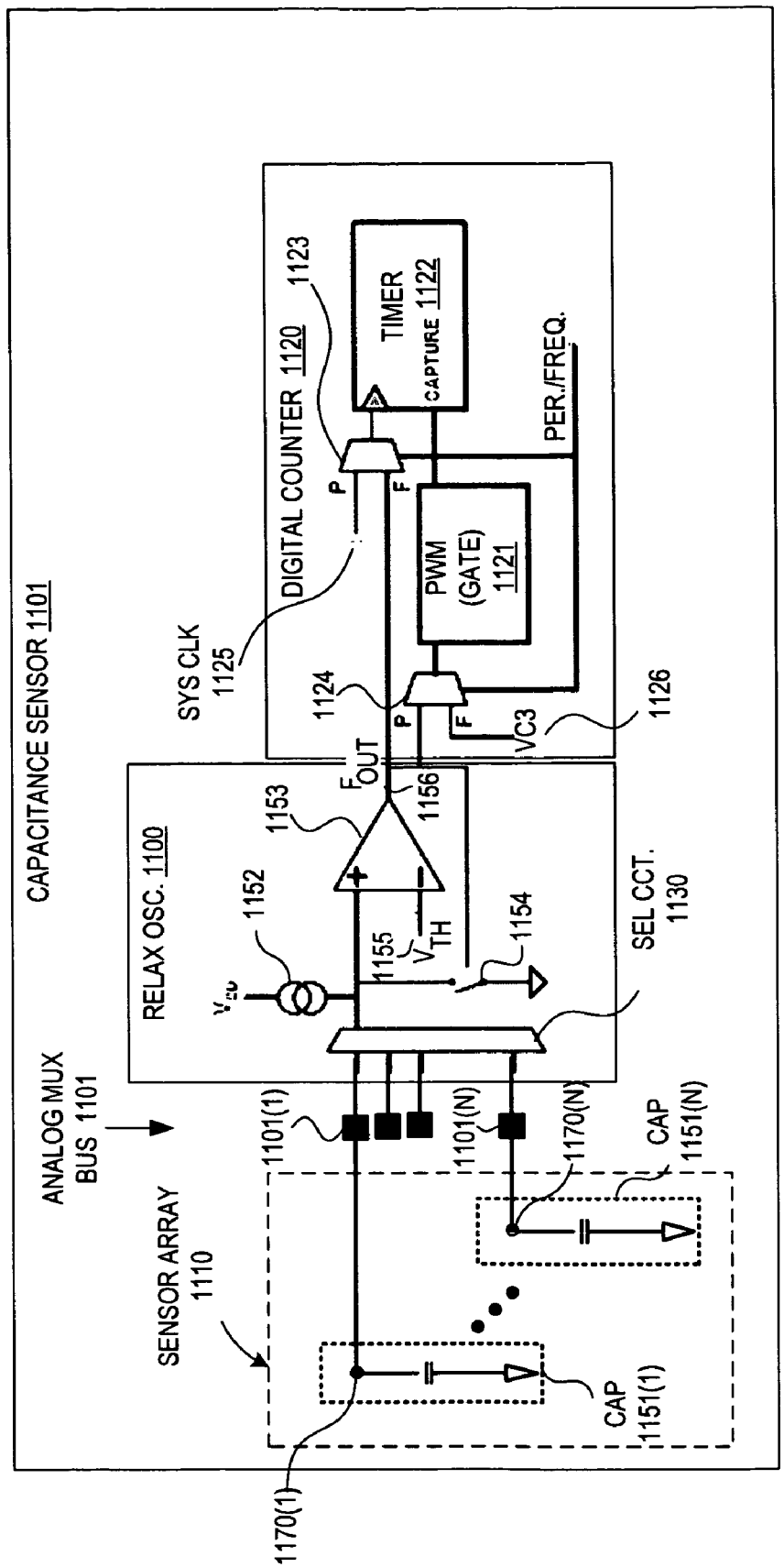
FIG. 11 is a circuit diagram illustrating a demonstrative capacitance sensor, in accordance with an embodiment of the invention.

FIG. 11 illustrates one possible embodiment of capacitance sensor 1001 implemented with a relaxation oscillator circuit 1100. The illustrated embodiment of capacitance sensor 1001 includes relaxation oscillator circuit 1100, an analog multiplexor ("MUX") bus 1101, a sensor array 1110, and a digital counter 1120. Analog MUX bus 1101 and selection circuit 1130 may collectively implement the functionality of I/O interfaces 325. The remaining portions of relaxation oscillator 1100 and digital counter 1120 may implement the functionality of capacitance sensor circuit 330. Sensor array 1110 may represent radial slider array 305 and the individual capacitor sensors 1151 may represent the individual CAP sensors 320.

Relaxation oscillator 1100 is formed by the capacitance to be measured on capacitor sensors 1151, a charging current source 1152, a comparator 1153, and a reset switch 1154. It should be noted that capacitor sensor 1151 are representative of the capacitance measured on a sensor element of a CAP sensor array. The relaxation oscillator is coupled to drive a charging current Ic in a single direction onto a device under test ("DUT") capacitor, any of capacitor sensors 1151. As the charging current piles charge onto the capacitor 1151, the voltage across the capacitor increases with time as a function of Ic and its capacitance C. Equation (1) describes the relation between current, capacitance, voltage and time for a charging capacitor.

$$CdV = I_C dt \quad (1)$$

The relaxation oscillator begins by charging the capacitor sensor 1151 from a ground potential or zero voltage and continues to pile charge on the capacitor 1151 at a fixed charging current Ic until the voltage across the capacitor 1151 at node 1170 reaches a reference voltage or threshold voltage, $V_{TH}$ 1155. At $V_{TH}$ 1155, the relaxation oscillator allows the accumulated charge at node 1155 to discharge (e.g., the capacitor 1151 to "relax" back to the ground potential) and then the process repeats itself. In particular, the output of comparator 1153 asserts a clock signal $F_{OUT}$ 1156 (e.g., $F_{OUT}$ 1156 goes high), which enables the reset switch 1154. This resets the voltage on the capacitor at node 1170 to ground and the charge cycle starts again. The relaxation oscillator outputs a relaxation oscillator clock signal ($F_{OUT}$ 1156) having a frequency ($f_{RO}$) dependent upon capacitance C of the capacitor 1151 and charging current Ic.

The comparator trip time of the comparator 1153 and reset switch 1154 add a fixed delay. The output of the comparator 1153 is synchronized with a reference system clock to guarantee that the comparator reset time is long enough to completely reset the charging voltage on capacitor 1155. For example, if capacitance C of the capacitor 1151 changes, then $f_{RO}$ will change proportionally according to Equation (1). By comparing $f_{RO}$ of $F_{OUT}$ 1156 against a frequency ($f_{REF}$) of a known reference system clock signal (REF CLK), the change in capacitance $\Delta C$ can be measured. Accordingly, equations (2) and (3) below describe that a change in frequency between $F_{OUT}$ 1156 and REF CLK is proportional to a change in capacitance of the capacitor 1151.

$$\Delta C \propto 1/\Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 1156) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 1151 has changed.

In one exemplary embodiment, the relaxation oscillator 950 may be built using a programmable timer (e.g., 555 timer) to implement the comparator 1153 and reset switch 1154. Alternatively, the relaxation oscillator 1100 may be built using other circuits.

Sensor array 1110 includes a plurality of sensor elements 1155(1)-1155(N), where N is a positive integer value that represents the number of capacitive sensors within any of capacitive sense pad 1020, capacitive sense linear slider 1030, or capacitive sense circular slider 1040. Relaxation oscillator 1100 further includes a selection circuit 1130. Selection circuit 1130 is coupled to the plurality of sensor elements 1151(1)-1151(N), the reset switch 1154, the current source 1152, and the comparator 1153. Selection circuit 1130 may be used to allow the relaxation oscillator 1100 to measure capacitance on multiple sensor elements (e.g., rows or columns). The selection circuit 1130 may be configured to sequentially select a sensor element of the plurality of sensor elements to provide the charge current and to measure the capacitance of each sensor element. In one embodiment, selection circuit 1130 is a multiplexer array of the relaxation oscillator 1100. Alternatively, selection circuit may be other circuitry outside the relaxation oscillator 1100, or even outside the capacitance sensor 1001 to select the sensor element to be measured. Capacitance sensor 1001 may include one relaxation oscillator and digital counter for the plurality of sensor elements of the sensor array. Alternatively, capacitance sensor 1001 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GPIO port 1007.

In another embodiment, the capacitance sensor 1001 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 1120 is coupled to the output of the relaxation oscillator 1100. Digital counter 1120 receives the relaxation oscillator output signal 1156 ($F_{OUT}$). Digital counter 1120 is configured to count at least one of a frequency or a period of the relaxation oscillator output received from the relaxation oscillator.

When a finger or conductive object is placed on a sensor element 1151, the capacitance increases so the relaxation oscillator output signal 1156 ($F_{OUT}$) decreases. The relaxation oscillator output signal 1156 ($F_{OUT}$) is fed to the digital counter 1120 for measurement. There are at least two methods for counting the relaxation oscillator output signal 1156, frequency measurement and period measurement. In one embodiment, the digital counter 1120 may include two multiplexers 1123 and 1124. Multiplexers 1123 and 1124 are configured to select the inputs for the PWM 1121 and the timer 1122 for the two measurement methods, frequency and period measurement methods. Alternatively, other selection circuits may be used to select the inputs for the PWM 1121 and the time 1122. In another embodiment, multiplexers 1123 and 1124 are not included in the digital counter, for example, digital counter 1120 may be configured in one, or the other, measurement configuration.

In the frequency measurement method, the relaxation oscillator output signal 1156 is counted for a fixed period of time. The counter 1122 is read to obtain the number of counts during the gate time. This method works well at low frequencies where the oscillator reset time is small compared to the oscillator period. A pulse width modulator (PWM) 1121 is clocked for a fixed period by a derivative of the system clock, VC3 1126 (which is a divider from system clock 1125, e.g., 24 MHz). Pulse width modulation is a modulation technique that generates variable-length pulses to represent the amplitude of an analog input signal; in this case VC3 1126. The output of PWM 1121 enables timer 1122 (e.g., 16-bit). The relaxation oscillator output signal 1156 clocks the timer 1122. The timer 1122 is reset at the start of the sequence, and the count value is read out at the end of the gate period.

In the period measurement method, the relaxation oscillator output signal 1156 gates a timer 1122, which is clocked by the system clock 1125 (e.g., 24 MHz). In order to improve sensitivity and resolution, multiple periods of the oscillator are counted with the PWM 1121. The output of PWM 1121 is used to gate the timer 1122. In this method, the relaxation oscillator output signal 1156 drives the clock input of PWM 1121. As previously described, pulse width modulation is a modulation technique that generates variable-length pulses to represent the amplitude of an analog input signal; in this case the relaxation oscillator output signal 1156. The output of the PWM 1121 enables timer 1122 (e.g., 16-bit), which is clocked at the system clock frequency 1125 (e.g., 24 MHz). When the output of PWM 1121 is asserted (e.g., goes high), the count starts by releasing the capture control. When the terminal count of the PWM 1121 is reached, the capture signal is asserted (e.g., goes high), stopping the count and setting the PWM's interrupt. The timer value is read in this interrupt. The relaxation oscillator 1100 is indexed to the next capacitive sensor (e.g., capacitor 1151(2)) to be measured and the count sequence is started again.

The length of the counter 1122 and the detection time required for capacitance sensor 1001 are determined by sensitivity requirements. Small changes in the capacitance on sensor element 1151 result in small changes in frequency. In order to find these small changes, it may be necessary to count for a considerable time.

At startup (or boot) the capacitive sensors (e.g., sensor elements 1151(1)-(N)) are scanned and the count values for each capacitive sensors with no actuation are stored as a baseline array (Cp). The presence of a finger on the switch is determined by the difference in counts between a stored value for no capacitive sensors actuation and the acquired value with capacitive sensors actuation, referred to here as Δn. The sensitivity of a single capacitive sensors is approximately:

$$\frac{\Delta n}{n} = \frac{Cf}{Cp} \qquad (4)$$

The value of Δn should be large enough for reasonable resolution and clear indication of capacitive sensors actuation.

Using the multiplexer array 1130, multiple sensor elements may be sequentially scanned to provide current to and measure the capacitance from the capacitors (e.g., sensor elements), as previously described. In other words, while one sensor element is being measured, the remaining sensor elements are grounded using the GPIO port 1007. This drive and multiplex arrangement bypasses the existing GPIO to connect the selected pin to an internal analog multiplexer (mux) bus. The capacitor charging current (e.g., current source 1152) and reset switch 1153 are connected to the analog mux bus. This may limit the pin-count requirement to simply the number of capacitive sensors (e.g., capacitors 1151(1)-1151(N)) to be addressed. In one exemplary embodiment, no external resistors or capacitors are required inside or outside the processing device 1110 to enable operation.

The capacitor charging current for the relaxation oscillator 1100 is generated in a register programmable current output DAC (also known as IDAC). Accordingly, the current source 1152 is a current DAC or IDAC. The IDAC output current may be set by an 8-bit value provided by the processing device 1010, such as from the processing core 1002. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
   sensing a user interaction with an array of capacitive sensors within a radial slider interface;
   determining whether at least a threshold number greater than one of the capacitive sensors within the array are concurrently actuated by the user interaction; and
   registering a center key actuation of the radial slider interface, if at least the threshold number of the capacitive sensors are concurrently actuated.

2. The method of claim 1, wherein the threshold number is equal to at least three of the capacitive sensors within the array.

3. The method of claim 1, wherein registering the center key actuation comprises registering the center key actuation, if at least the threshold number of the capacitive sensors are concurrently actuated and at least two of the concurrently actuated capacitive sensors are physically non-radially adjacent and separated by unactuated capacitance sensors.

4. The method of claim 1, wherein registering the center key actuation comprises registering the center key actuation, if at least the threshold number of the capacitive sensors are concurrently actuated and at least two of the concurrently actuated capacitive sensors are physically located opposite of each other within the radial slider interface.

5. The method of claim 1, wherein the radial slider interface does not include a center mechanical button.

6. The method of claim 1, wherein the capacitive sensors of the array of capacitive sensors are physically oriented radially about a center of the radial slider interface.

7. The method of claim 6, further comprising sensing a mechanical actuation of at least one mechanical button positioned under the array of capacitive sensors, the at least one mechanical button positioned off-center of the radial slider interface,
wherein registering the center key actuation of the radial slider interface comprises registering the center key actuation, if at least the threshold number of the capacitive sensors are concurrently actuated while sensing the mechanical actuation of the at least one mechanical button positioned off-center.

8. The method of claim 7, wherein the at least one mechanical button comprises four mechanical buttons positioned under the array of capacitive sensors in up, down, left, and right positions.

9. A machine-readable medium that provides instructions that, if executed by a machine, will cause the machine to perform operations comprising:
sensing a user interaction with an array of capacitive sensors within a radial slider interface;
determining whether at least a threshold number greater than one of the capacitive sensors within the array are concurrently actuated by the user interaction; and
registering a center key actuation of the radial slider interface, if at least the threshold number of the capacitive sensors are concurrently actuated.

10. The machine-readable medium of claim 9, wherein the threshold number is equal to at least three of the capacitive sensors within the array.

11. The machine-readable medium of claim 9, wherein registering the center key actuation comprises registering the center key actuation, if at least the threshold number of the capacitive sensors are concurrently actuated and at least two of the concurrently actuated capacitive sensors are physically non-radially adjacent and separated by unactuated capacitance sensors.

12. The machine-readable medium of claim 9, wherein registering the center key actuation comprises registering the center key actuation, if at least the threshold number of the capacitive sensors are concurrently actuated and at least two of the concurrently actuated capacitive sensors are physically located opposite of each other within the radial slider interface.

13. The machine-readable medium of claim 9, further providing instructions that, if executed by the machine, will cause the machine to perform further operations, comprising:
sensing a mechanical actuation of at least one mechanical button positioned under the array of capacitive sensors, the at least one mechanical button positioned off-center of the radial slider interface,
wherein registering the center key actuation of the radial slider interface comprises registering the center key actuation, if at least the threshold number of the capacitive sensors are concurrently actuated while sensing the mechanical actuation of the at least one mechanical button positioned off-center.

14. The machine-readable medium of claim 13, wherein sensing the mechanical actuation of the at least one mechanical button comprises sensing the mechanical actuation of at least one of four off-center mechanical buttons position under the array of capacitive sensors in up, down, left, and right positions.

15. An apparatus, comprising:
a processing device;
a radial slider user interface including an array of capacitive sensors coupled to the processing device; and
a memory unit coupled to the processing device, the memory unit having stored therein instructions that, if executed by the processing device, will cause the processing device to perform operations comprising:
sensing a user interaction with the array of capacitive sensors;
determining whether at least a threshold number greater than one of the capacitive sensors within the array are concurrently actuated by the user interaction; and
registering a center key actuation of the radial slider user interface, if at least the threshold number of the capacitive sensors are concurrently actuated.

16. The apparatus of claim 15, wherein the processing device includes:
a capacitance sensor coupled to measure values indicative of a capacitance of each of the capacitive sensors; and
an analog multiplexer bus coupled to sequentially couple the capacitive sensors within the array of capacitive sensors to the capacitance sensor.

17. The apparatus of claim 16, wherein the capacitance sensor comprises a relaxation oscillator circuit.

18. The apparatus of claim 15, wherein the threshold number is equal to at least three of the capacitive sensors within the array.

19. The apparatus of claim 15, further comprising four off-center mechanical buttons position under the array of capacitive sensors in up, down, left, and right positions.

20. The apparatus of claim 19, wherein the memory unit further stores instructions that, if executed by the machine, will cause the machine to perform further operations, comprising:
sensing a mechanical actuation of at least one of the off-center mechanical buttons,
wherein registering the center key actuation comprises registering the center key actuation, if at least the threshold number of the capacitive sensors are concurrently actuated while sensing the mechanical actuation of the at least one the off-center mechanical buttons.

* * * * *